United States Patent
DeVos et al.

(10) Patent No.: US 12,259,938 B2
(45) Date of Patent: Mar. 25, 2025

(54) DELIVERING RESPONSES TO QUERIES EXPRESSED IN NATURAL LANGUAGE BASED ON A DYNAMIC DOCUMENT CORPUS

(71) Applicant: Qdeck Inc., Bellevue, WA (US)

(72) Inventors: Luke Thomas DeVos, Pittsburgh, PA (US); Timothy James Ireland, II, Bellevue, WA (US); Abigail Lynn Ireland, Bellevue, WA (US); Siu Tang Leung, Seattle, WA (US); Andrei Modoran, Bellevue, WA (US); Brad Steven Ostercamp, Carnation, WA (US); Jagdeesh Prakasam, Mercer Island, WA (US)

(73) Assignee: Qdeck Inc., Bellevue, WA (US)

( * ) Notice: Subject to any disclaimer, the term of this patent is extended or adjusted under 35 U.S.C. 154(b) by 0 days.

(21) Appl. No.: 18/655,024

(22) Filed: May 3, 2024

(65) Prior Publication Data
US 2024/0370517 A1    Nov. 7, 2024

Related U.S. Application Data

(60) Provisional application No. 63/499,945, filed on May 3, 2023.

(51) Int. Cl.
*G06F 16/00* (2019.01)
*G06F 16/955* (2019.01)
*G06F 16/957* (2019.01)
*G06F 40/295* (2020.01)

(52) U.S. Cl.
CPC ........ *G06F 16/9558* (2019.01); *G06F 16/957* (2019.01); *G06F 40/295* (2020.01)

(58) Field of Classification Search
CPC ..................................................... G06F 16/957
See application file for complete search history.

(56) References Cited

U.S. PATENT DOCUMENTS

2021/0149980 A1*  5/2021  Pavlini .................. G06F 16/338

* cited by examiner

*Primary Examiner* — Ajith Jacob
(74) *Attorney, Agent, or Firm* — Perkins Coie LLP (57) ABSTRACT

A system and method generate answers to user queries by providing natural language responses containing direct citations to primary sources. The system comprises a data collection pipeline that ingests, processes, and organizes data from multiple sources, and a retrieval mechanism that processes user queries, identifies relevant data, and employs a machine learning model, such as a Large Language Model (LLM), to generate natural language responses based on the retrieved data. The generated responses are augmented with direct references to the primary sources, ensuring accurate attribution and up-to-date information. This system combines the natural language capabilities of LLMs with the direct connections to primary sources provided by traditional search engines, delivering real-time, dynamic processing of resources without incurring high re-training costs.

20 Claims, 8 Drawing Sheets

DELIVERING RESPONSES TO QUERIES EXPRESSED IN NATURAL LANGUAGE BASED ON A DYNAMIC DOCUMENT CORPUS

CROSS-REFERENCE TO RELATED APPLICATION

This application claims the benefit of U.S. Provisional Patent Application No. 63/499,945, filed May 3, 2023, which is incorporated herein by reference in its entirety.

FIELD OF THE DISCLOSURE

The present Disclosure relates to the field of information processing, specifically concerning the procurement of information rapidly from a large set of data.

BRIEF SUMMARY OF THE DISCLOSURE

Search engines form the backbone of the modern internet, allowing users to discover information of interest rapidly without resorting to manual search of the immense volume of data available. However, even the best search engines deliver their responses primarily in the form of an index of resources, instead of directly attempting to answer the query submitted by a user of the search engine. Search engines additionally may struggle with queries expressed in natural language, instead requiring the user to produce a restricted query that complies with rules specific to the search engine.

The recent creation of Large Language Models (LLMs) by technology companies and research institutions has enabled a new mode of interacting with user queries, where a software system can behave in a manner that imitates a human conversational partner. The user communicates with the system in terms of natural language explanations of what they desire, enabling contextual expression far greater than what search engines support. This type of interface has proven extremely compelling in many instances, but the systems underlying these advances present multiple deficiencies.

Specifically, LLMs as currently implemented are only able to produce responses based on a fixed corpus of training data, often data that is scraped from the web and then cleaned manually by human researchers. This data is sufficient to answer many user queries, but the process for updating the model is extremely resource intensive.

Tools have been developed that allow addition of dynamic resources, e.g. the result of web queries, to the content of a user query for an LLM before the model produces a result. While this can help address problems with the recency of data, it does not enable the LLM to identify which resources were used to compose an answer or to ensure that the answer produced faithfully represents information derived from those resources. This problem is exacerbated when information in the response was derived from a source in the training dataset and not something added to the query by such a tool.

Therefore, the need exists for a system that has the same natural language interface as an LLM but the capacity to deliver direct connections to primary sources as facilitated by a traditional search engine. Such a system should be able to dynamically process resources in real time without the exorbitant costs associated with re-training an LLM and should be able to provide natural language responses that accurately cite all resources used in composing the response.

The present disclosure relates to an architecture of a question answering and resource gathering system that builds upon the strengths of both traditional search engines and Large Language Models. The architecture includes a pipeline that ingests, processes, and organizes data, and a retrieval mechanism that processes user queries, identifies relevant data, and then employs an LLM to compose a response containing direct references to that data and a controlled amount of auxiliary information. These components refer to the architecture and algorithmic design of the system in question, not to specific software realizations thereof. The present disclosure describes a process which when implemented in software delivers responses to queries made in natural language. The system collects primary source information from a repository of data like a search engine but delivers the response in the format of a summary document written in the same natural language as the query, with appropriate citations of those primary sources.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION OF THE INVENTION

Figure 1:
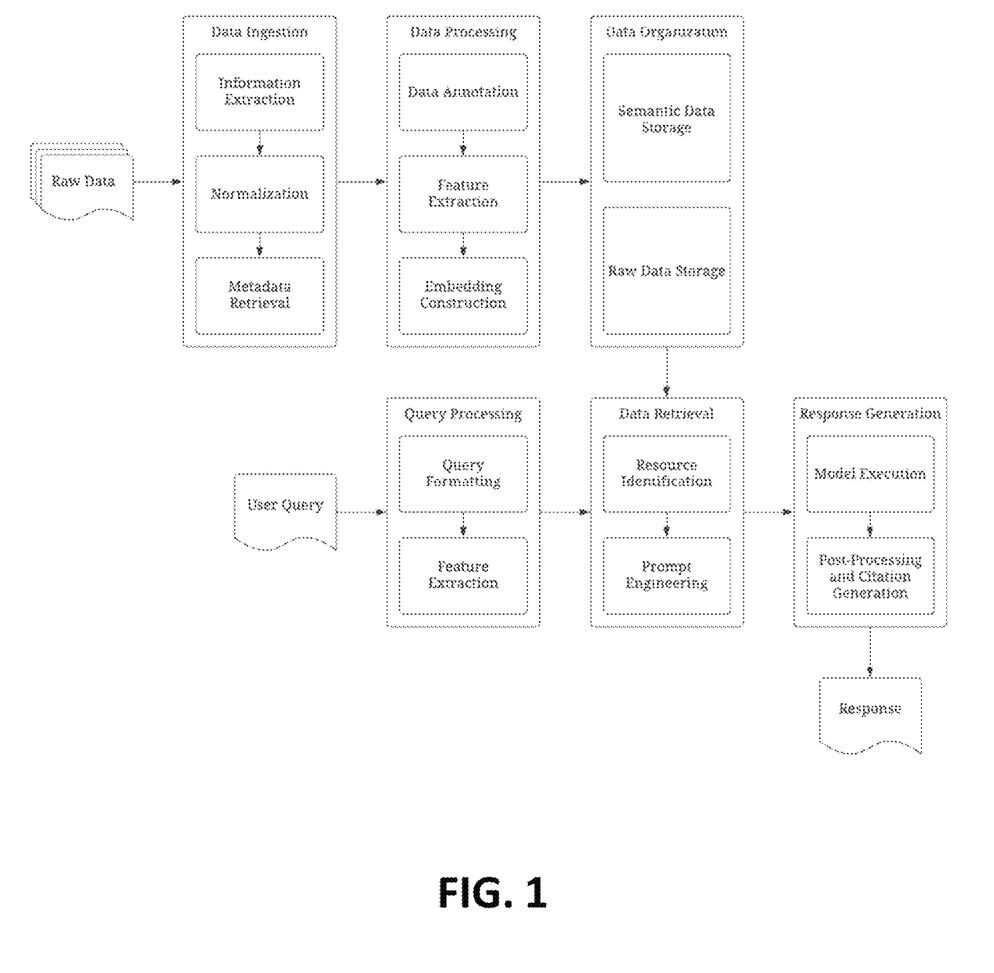
FIG. 1 depicts a block-level overview of an architecture for retrieving and presenting news, according to some implementations of the disclosed technology.

FIG. 1 is a high-level block diagram illustrating an architecture for retrieving and presenting news, according to some implementations. As shown in FIG. 1, the architecture contains two primary sub-processes: a data collection pipeline that ingests, processes, and organizes data from various sources, and (2) a retrieval mechanism that processes user queries, identifies relevant data, and employs machine learning models, such as those drawn from the class of Large Language Models (LLMs) to generate a natural language response that contains citations of the sources utilized in the generation of that response. For example, the citations can be direct citations to the primary sources referred to in the generation of that response.

The data collection pipeline is responsible for collecting, processing, and organizing data from multiple sources, including but not limited to websites, databases, and APIs. The pipeline comprises several subcomponents, including a data ingestion component, a data processing component, and a data organization component, as illustrated in FIG. 1.

The data ingestion component fetches data from various sources, including but not limited to web data, database entries, and API calls. This component primarily concerns the collection of data and basic extraction of relevant information, as well as normalization of data to comply with internal standards. Data ingestion can be performed at an arbitrary frequency based on the requirements of the application of the system. Data collected can be aggregated with no limit except that imposed by the limitations of the hardware employed, and as such the information that can be retrieved by the system can be kept up-to-date indefinitely.

Data ingestion includes software components built to interface directly with the source documents, including parsers for specific file types, clients for APIs, or database connections. Once the raw documents have been loaded into system memory in a programmatically accessible format, the components of interest like text, numerical figures, and images are each extracted into standard containers, e.g., bitmaps for images, utf-16 character buffers for text. This extraction system is customized for the format of the data in question, collecting metadata like geographic location, publication time, and original source alongside the content that will be referenced by the query answering system.

After data ingestion, the data is transformed to aid in future organization and reference of relevant content. The core goals of this step are to break large data buffers into smaller components that can be atomically referenced later, as well as to generate features from the data that will aid in organization and identification. In the case of textual data, for example, irrelevant text may be removed, named entities are identified and associated with unique IDs, sentiment scores, relevance scores, and topics are generated from the content, and all this information is additionally mapped through vector embeddings to generate compact latent representations of the data. Each task corresponds to a pre-trained machine learning model, which for efficiency is based off a common language encoding model when possible. The application of multiple models to extract useful features as opposed to a single end-to-end Large Language Model comes with many benefits, including the capacity to independently evaluate model performance and update subcomponents asynchronously, as well as the ability to distribute data transformation and processing across networked compute resources.

Figure 2A:
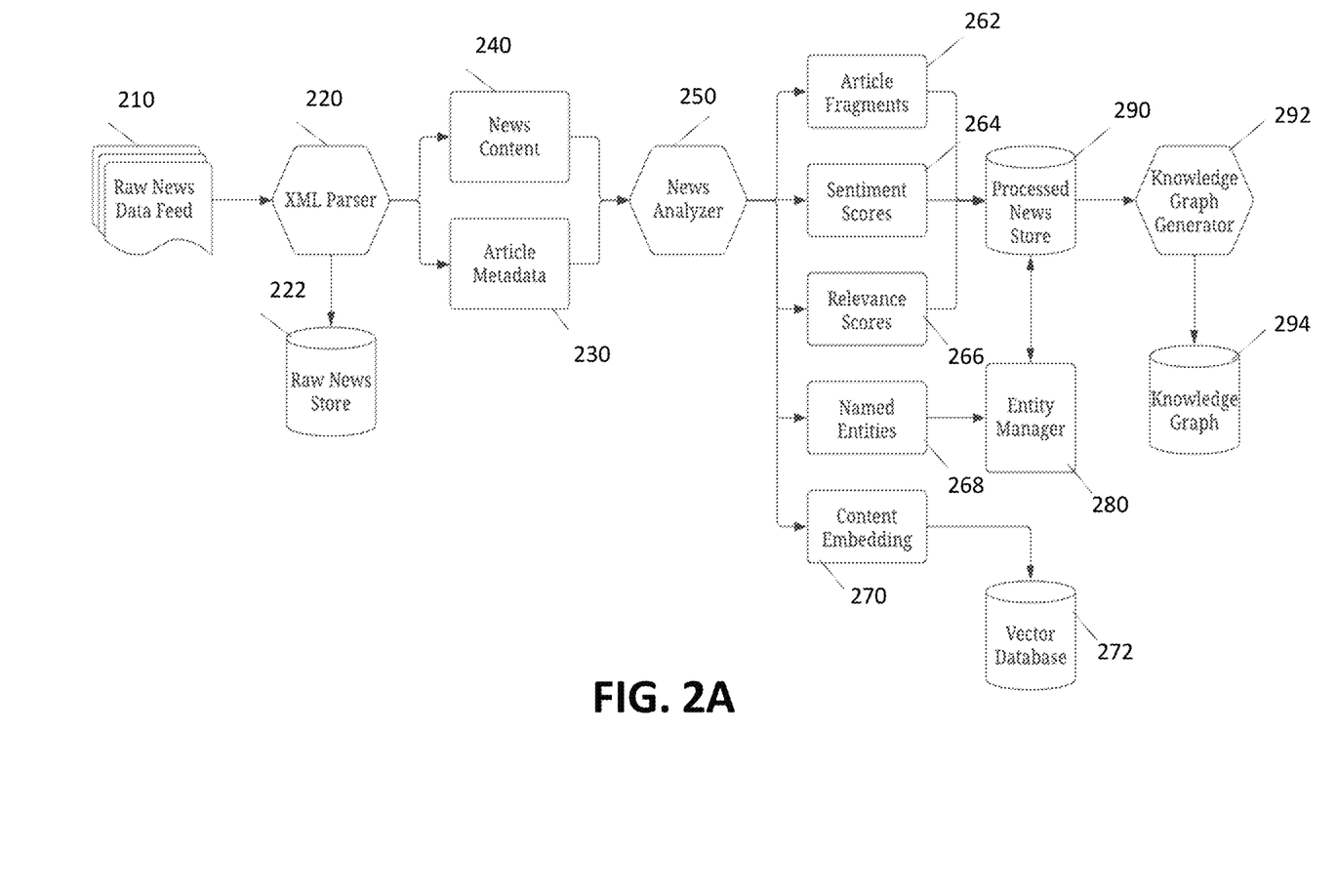
FIG. 2A is a flow diagram depicting a process performed by the disclosed platform according to some implementations of the disclosed technology.

The data organization component involves taking the results of data processing and organizing them into a searchable data structure. The most commonly applied data structures in this task are graph databases, for storing discrete contextual information, and vector databases, for storing compact representation of atomic data objects. These structures will facilitate efficient retrieval of relevant information during the query processing phase. Data is also stored in an unmodified format that allows retrieval of the raw source information and the extracted features, such that search through the semantic data stores can be used to inform retrieval of accurate primary source information that would have been difficult to identify rapidly with a naïve approach. FIG. 2A illustrates an example process performed by the data collection pipeline.

The second main component illustrated in FIG. 1 is the retrieval mechanism, which is responsible for processing user queries, identifying relevant data from the organized data structure, and generating a natural language response using an LLM. The retrieval mechanism comprises several subcomponents, including a query processing component, a data retrieval component, and a response generation component, as illustrated in FIG. 1.

Figure 3:
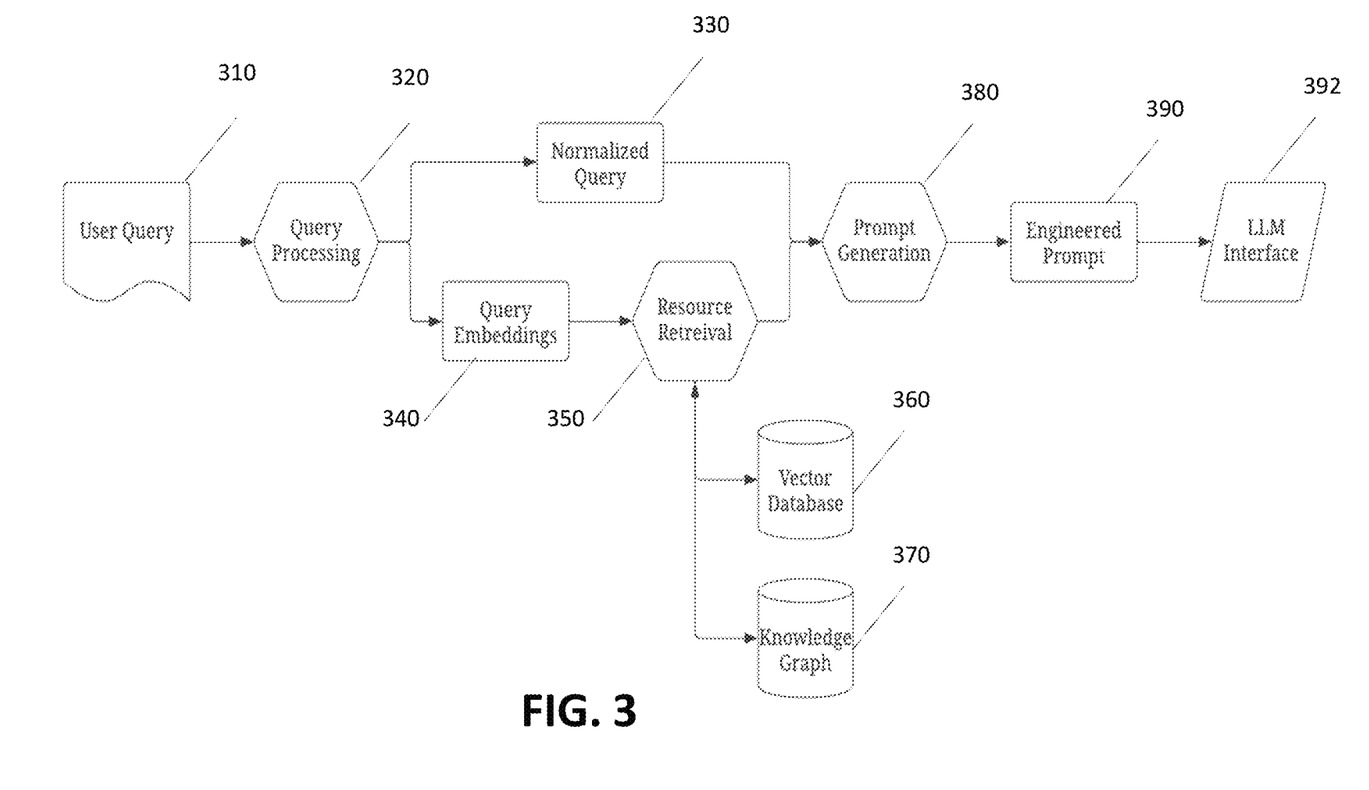
FIG. 3 is a flow diagram depicting a process performed by the disclosed platform according to some implementations of the disclosed technology.

User queries are processed to identify keywords, phrases, and concepts relevant to the query. This involves application of multiple pre-trained models for natural language understanding, which may extract the names of known entities, determine the linguistic subcomponents of the query, and associate the content of the query with knowledge graphs or other dynamic structures for storing linguistic information that are built by the data organization system in real time. Specific techniques for implementing these models may be context-dependent, though use of a common set of models or architectures yields performance improvements. These models overlap with those employed to process input documents in the data transformation step, though certain tasks like summarization and relevance scoring are less relevant for user queries than they are for long-form input documents. User queries are also transformed to make them suitable for the data retrieval and response generation process, potentially including augmentation with other information relevant to the user or to the query's context. This processing can include techniques common in natural language understanding, such as tokenization of the text, replacement or annotation of named entities with unique keys, and embedding of the resulting transformed queries to enable numerical alignment between the query and stored data. FIG. 3 illustrates an example process performed to process the received user query.

The processed query and any relevant metadata, e.g. the identities of named entities extracted from the query or semantic labels applied to the query text, are then employed by the data retrieval system. This system identifies relevant data from the organized data structure and collects the components of that data that may be useful for generating a response to the query. This identification process achieved through a combination of techniques such as keyword search, semantic search, or vector embedding comparison, which will individually depend on the underlying data organization. The key approach for broadly identifying relevant information from the data store will concern application of a vector embedding model and suitable comparison metric, e.g. the dot-product distance between embedding vectors. Additional identification techniques are then applied to clean the results by removing duplicates and suppressing spurious relationships. This is accomplished through the use of contextual data stores like the knowledge graph created by the data organization step from the input pipeline to find and combine synonyms or other colliding topics.

Once the relevant data is retrieved, it is organized and formatted alongside the processed query to prepare appropriate input for the response generation procedure. Special attention must be paid to how this organization is performed to render a prompt suitable for use as input to subsequent steps. In practice the format is engineered for the specific application, e.g., a form template optimized to arrange news headlines in such a way that they are reliably parsed by the specific model to which they will be provided as input. In response generation a powerful model such as an LLM is employed to generate a natural language response. The LLM is provided with the formatted prompt, which contains additional context helpful to generate an accurate and coherent response. The generated response is then processed to ensure accurate reproduction of primary source information and compliance with any relevant filters and augmented with direct references to the data sources used in composing the response.

Figure 4:
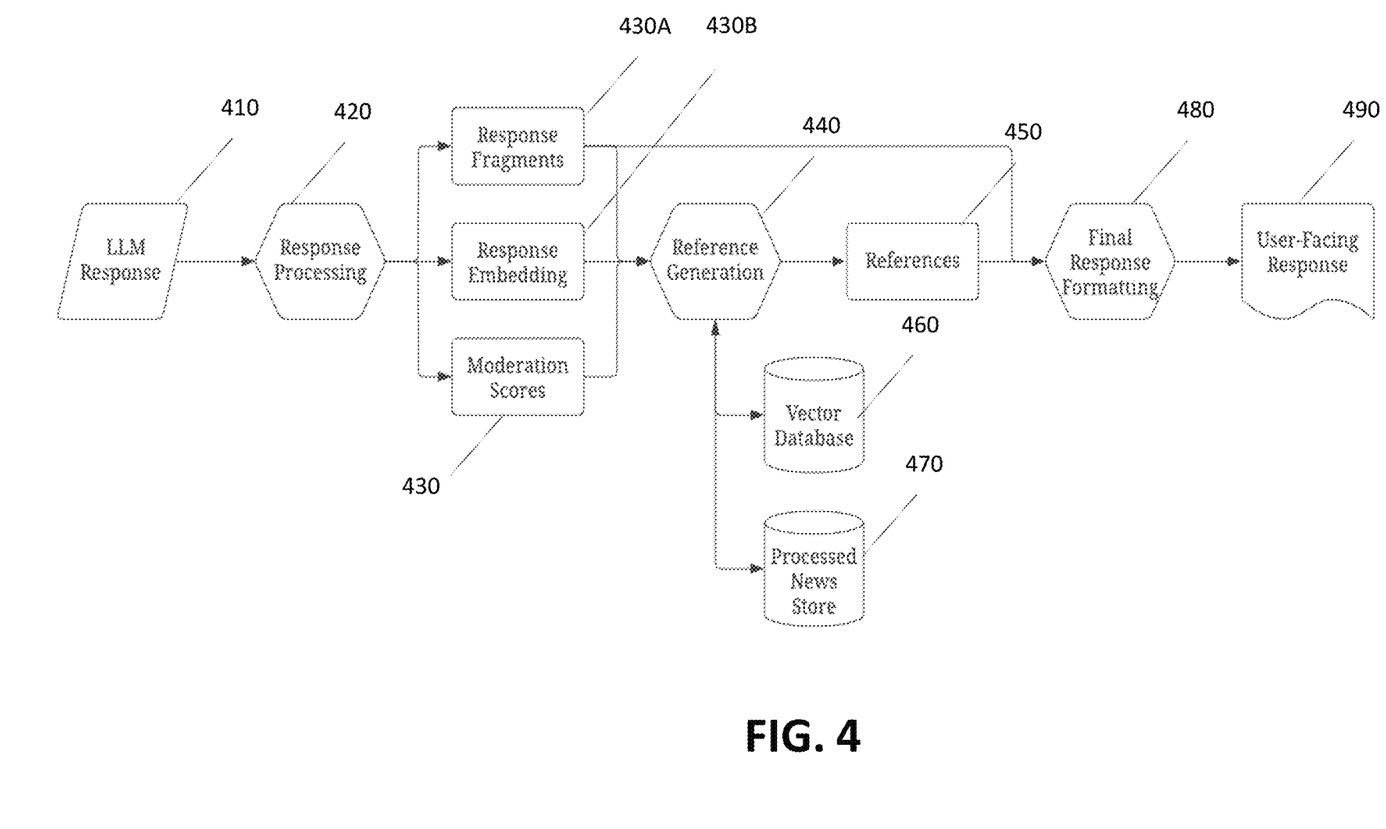
FIG. 4 is a flow diagram depicting a process performed by the disclosed platform according to some implementations of the disclosed technology.

The post-processing is extensive and involves applying the same sort of natural language understanding techniques used to process the input data to identify relevant components of the response and generate embeddings of the response components that can be used to determine relationships between the response and the input text. Response components that contain direct quotes of the input documents or that score above an application-specific threshold are determined to be drawn from the document in question and are annotated as such. The annotations can then be transmitted to the user for each part of the response, such that individual sentences or sentence clauses are appropriately marked with citations of source documents. This ensures that users receive accurate, up-to-date information with clear attribution to the original sources. FIG. 4 illustrates an example process performed to generate a user facing response illustrated in FIG. 5.

For example, the citations can be embedded into the response text for the user-facing response. In some examples, the citations can be embedded as computer-executable code to display an interactive element for the user, such as a hyperlink (e.g., to the feed).

FIG. 2A illustrates an example process performed by the data collection pipeline. In the example process of FIG. 2A, the system may first receive or otherwise access one or more documents as part of a raw news data feed 210. Although referred to herein as raw news data feed 210, the data feed can be any data feed configured to periodically or continuously stream new information as one or more data structures or files. For example, the data may include a variety of input data formats, and the system may internally operate on both structured and non-structured text data. According to some examples, the data feed may be a feed of structured XML documents containing licensed news content as well as PDF documents with no specific internal structure. The feed may include documents or data from multiple sources having different data types, varying structure, and/or standards.

Data processing may involve extracting information from these documents and generating a unified data representation that is compatible with subsequent steps. For example, a raw data item is input to an XML parser 220 to generate a raw news item for storage in a raw news store 222. The XML parser can output news content 240 (e.g., any text, images, or graphs within the raw data item input to the parser 220) and article metadata 230 (e.g., author, publisher, date of publication, etc.). Structured documents may be easy to parse, as the format a document has been supplied in can be determined and then a parsing routine suitable for that specific format may be applied. Alternatively or additionally, for unstructured documents, information extraction is performed using an iterative approach, with progressively more computationally expensive techniques employed when it is detected that extraction failed. For example, given a document containing financial statements, a simple PDF parsing routine written in python can be initially applied. The presence of tables and other content that does not render well when extracted as text would likely result in a poorly formed output of this parser.

A model trained to identify well-formed text can assign a high probability of improper parsing to the output, which may trigger a second extraction pass. In this second pass the document can instead be re-interpreted as a series of images and analyzed using multimodal computer vision models capable of visually extracting text, tables, and graphics. The output of the model can be run through the model that determines appropriate extraction, and if it passes that check it will be submitted to a news analyzer 250.

According to some examples, the output of these data processing routines is a uniform, standardized format for all documents, which contains all extracted text as well as any auxiliary information like metadata from the news feed or images and tables identified in an unstructured document. In some examples, all information is persisted in an object database before further processing to enable later reference to the primary source. In one example, these parsing routines are designed to be highly parallel (e.g., mostly parallel with the exception of some parsing), which allows the system to keep up with broad real-time sources and variable demand from users.

Figure 2B:
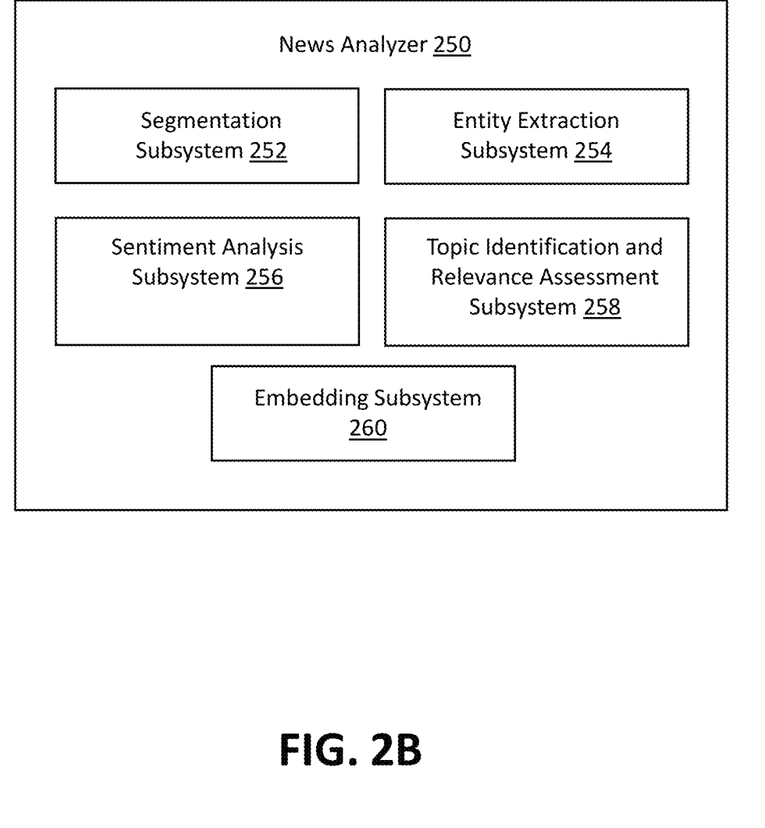
FIG. 2B is a block diagram illustrating components of an analysis system, according to some implementations of the disclosed technology.

FIG. 2B is a block diagram illustrating components of an analysis system such as the news analyzer 250, according to some implementations of the disclosed technology. Although the system is referenced herein as a news analyzer, the system can also be able to process and analyze documents generally, including documents having no relation to news. Once documents are rendered in an appropriate format (e.g., a standardized format configured to be processed by the system), the system thoroughly processes the documents to produce rich internal representations of the information contained within the documents. The process may include several steps for analyzing the data. For example, in the case of FIG. 2B, the news analyzer 250 includes a segmentation subsystem 252, entity extraction subsystem 254, sentiment analysis subsystem 256, topic identification and relevance assessment subsystem 258, and embedding subsystem 260 configured to perform various steps of the analysis.

The input text from the document may be segmented as part of the analysis. For example, the input text from the document may be segmented by segmentation subsystem 252. According to some examples, the segmentation subsystem 252 may apply one or more segmentation techniques in parallel to divide longer passages into sections that represent a single idea or concept. The segmentation techniques may include simpler techniques, such as splitting the text at punctuation, or more complex approaches such as using a model specifically trained the task of segmenting text by idea or concept. These resulting sections may include sentence fragments, full sentences, and/or paragraphs. Each segment identified by this procedure can be used as a valid source for reference in future retrieval steps, allowing the system to identify relevant information at a level much more granular than full documents. The results of segmentation subsystem 252 may include, for example the article fragments 262 of FIG. 2A.

Once segmentation has been completed, or in parallel to the segmentation process, the news analyzer 250 may pass the input text to the entity extraction subsystem 254. The entity extraction subsystem 254 may analyze the full document to identify entities. According to some examples, entities may include subjects, proper nouns, and/or events.

Each entity discovered in this way may be compared to an online world-model represented as a knowledge graph to disambiguate it. According to some examples, the knowledge graph may be a structured data format where entities are represented as nodes and the relationships between them are represented as edges. According to some examples, this knowledge graph is updated with any new entities first observed in the current document, and any matches for entities in the document are used to improve the accuracy of coreference resolution and other modeling steps. The results of entity extraction subsystem may include, for example named entities 268 of FIG. 2A.

The knowledge graph 294 of FIG. 2A is an exemplary knowledge graph according to embodiments described herein. The knowledge graph 294 may be managed or generated by knowledge graph generator 292. It may take in as input data stored in the processed news store 290 which stores data such as article fragments 262, sentiment scores 264, and relevance scores 266.

The continuous construction of the knowledge graph in the entity extraction subsystem may be an important component of the system's operation, as it serves to ground entities mentioned in a single document to the information present in the full corpus of documents. By enabling continuous updating of the world-model represented by this knowledge graph as well as enabling instantaneous checkpointing, the state of the world-model at any historical date as well as the current state can be produced at any time. This means that the analyzer can recognize entities as belonging to a particular class or as corresponding to a specific object in the world, e.g., a person, company, or geographic location, even when this information is not explicitly contained in the document currently being analyzed.

Segmentation subsystem 252 may pass the segmented text resulting from the segmentation step to the sentiment analysis subsystem 256. The sentiment analysis subsystem 256 may include a model that processed the segmented text and assigns a series of scores to the segmented text related to emotional valence or expressed sentiment. The scores can be used in later steps to aggregate information based on sentiment or to further inform models used to construct responses to users. The results of sentiment analysis subsystem 256 may include, for example the sentiment scores 264 of FIG. 2A.

As shown in FIG. 2B, the news analyzer 250 further includes topic identification and relevance assessment subsystem 258. Topic identification and relevance assessment subsystem 258 may use information from the previous steps, such as identified entities, sentiment scores, and/or segmented text in combination with a purpose-built neural network to score each segment extracted from a document scored based on their importance to the total information content of the document. Segments with a high score are then used to determine the topic or topics present in the document to assist with later retrieval. The results of topic identification and relevance assessment subsystem 258 includes may include, for example, relevance scores 266 of FIG. 2A. For example, the system may identify, for each document of the set of documents, a set of segments having importance scores that exceed a threshold score and determine, based on segments having importance scores that exceed the threshold score, one or more topics present in each document.

The news analyzer 250 further includes embedding subsystem 260. The embedding subsystem 260 is configured to input the segmented text from the segmentation subsystem 252 into one or more embedding models. The one or more embedding models can transform the raw text into high-dimensional vectors suitable for semantic search and indexing. In some examples, multiple embedding models can be applied together to improve the quality of the indexing. Additionally, the embeddings can be compressed and ensembled after initial generation to improve computational performance for retrieval and reduce storage burden for the additional metadata generated. For example, embeddings may be compressed from high-dimensions in a vector space to a lower-dimensionality while preserving important semantic information. According to some examples, compression can be performed through one or more techniques such as principal component analysis (PCA), t-SNE, or quantization methods. By compressing embeddings, the model becomes more memory efficient and faster to compute. Similarly, ensembling may involve combining multiple embeddings from different sources or models to improve performance, e.g., by averaging the embeddings, concatenating the embeddings, or using techniques such as weighted averages of the embeddings or stacking. The results of embedding subsystem 260 may include, for example, content embeddings 270 of FIG. 2A, which can be stored in a vector database 272.

According to some examples, all inputs into the news analyzer 250 may be processed through the subsystems of the news analyzer. Additionally or alternatively, some or all of the inputs may be additionally processed using one or more additional steps. In one example, the system may determine, based on characteristics of the system, whether or not to apply one or more steps. For example, based on the complexity or nature of the text, the system may determine to use all or a subset of the processing steps available.

According to some examples, one or more of the models used to accomplish these steps can be neural networks. The model may include large-language models, bidirectional encoder representations from transformers (BERT) models, robustly optimized BERT pretraining approach (RoBERTa) model, BERT, and/or the like. Depending on the task, the system may use a fine-tuned base model, while for others more training from scratch may be required.

After all analysis steps are completed, the results of the analysis are passed and/or otherwise persisted to multiple databases for retrieval. For example, the results may be passed to any or all of the processed news store 290, entity manager 280, or vector database 272. All scores and annotated text may be stored in a relational database such as the processed news store 290 of FIG. 2A, while embedding vectors paired with unique identifiers are stored in a vector database for fast indexing such as vector database 272 of FIG. 2A. Both the knowledge graph 294 and the vector database 272 can be used for data retrieval.

Implementations of the architecture and algorithmic design described herein enable the system to leverage the natural language capabilities of LLMs while providing direct connections to primary data sources, as facilitated by traditional search engines. This allows the system to deliver real-time, dynamic processing of resources without incurring the prohibitive costs associated with re-training an LLM, while also providing accurate attribution for all resources used in composing the response.

Figure 5:
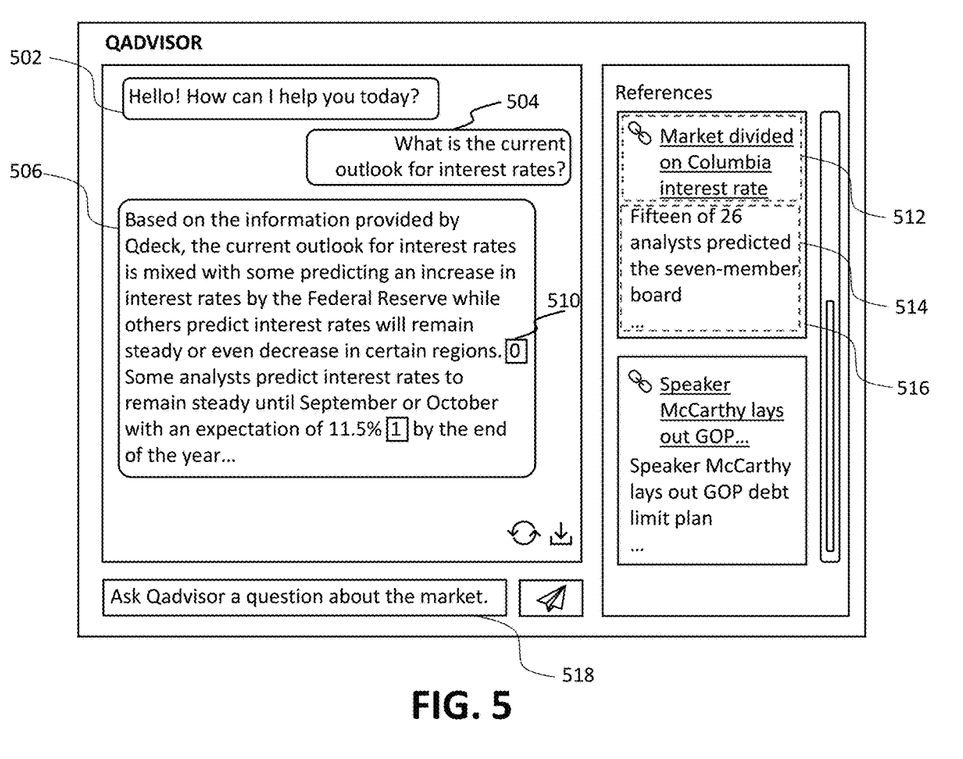
FIG. 5 depicts an example user interface presented by some implementations of the disclosed technology.

FIG. 3 is a flow diagram depicting a process for prompt engineering performed by the disclosed platform according to some implementations of the disclosed technology. A query 310 is received based on a user input at a user interface, an example of which is illustrated in FIG. 5. For example, when a query 310 is submitted such as through the user interface of FIG. 5, the system may determine whether or not the query is an appropriate query, such as through one or more checks for structure of the query. Alternatively or additionally, the query 310 may first go through the process described in FIG. 3 to obtain a prompt using the query that is better-suited to elicit a response and retrieve data. For example, converting unstructured text to structured values using semantic embeddings can significantly speed up queries.

The query may be processed during query processing 320. For example, processing the query may include normalization to optimize the query for efficient data retrieval. For example, the normalization process may include transforming a database into a series of two-dimensional tables, each comprising a unique row (e.g., tuple) and a unique column (e.g., attribute). The normalized query 330 may be stored or passed downstream for prompt generation 380. Alternatively or additionally, query processing 320 may include processing the query using various embedding techniques such as PCA, t-SNE, word2vec, using a model, and/or the like. The resulting query embeddings may be stored or passed downstream for resource retrieval 350. For example, the resource retrieval 350 may include accessing data from vector database 360 and knowledge graph 370.

In particular, if the query is determined to represent an appropriate input for data retrieval, a hybrid approach can be employed to determine which information is optimal to augment the generation of a response. The first pass for data retrieval involves processing the query 310 into an appropriate set of search topics and then embedding those topics during query processing 320 with the same models used in the analysis step to obtain the query embeddings 340. The query embeddings 340 may then be compared against the vector database 360 to retrieve identifiers (e.g., IDs) associated with potentially useful source information. The indicated source information is then loaded from the relational database. These source fragments are then processed to remove redundant information and ranked based upon the metadata from the analysis step, the presence of relevant topics, and the absence of common confounding variables. The ranked source information is then used along with the processed user query to compose an input to the large language model responsible for generating a final response. During prompt generation 380, the normalized query 330 may be used to generate the engineered prompt 390 for input into the LLM interface 392.

This multi-step data retrieval process dramatically reduces the incidence of irrelevant information retrieval and ensures that the large language models used to compose an answer for the system operator are strongly guided towards using the appropriate primary source information. Additionally, the world model represented in the knowledge graph provides an important source of grounding for the vector-based semantic search, as it can be used to reject semantically similar but irrelevant information. For example, if a user asks about a specific technology company like Amazon, their query may be semantically similar to some published information about Google or Apple. However, the grounding from the world-model allows us to recognize that these references do not involve the topic of the query, and as such should be ranked lower in relative importance for generation of the final response.

FIG. 4 is a flow diagram depicting a process for data retrieval performed by the disclosed platform according to some implementations of the disclosed technology. The LLM response 410. The system may process the response through response processing 420. Response processing 420 may include segmenting or fragmenting the response text to obtain response fragments 430A. For example, response processing may include parsing, segmentation, extraction and/or post processing in order to obtain the response fragments 430A. Similarly, response processing 420 may further include embedding techniques such as described herein to obtain response embeddings 430B.

Response processing 420 may further include obtaining moderation scores 430C. Moderation scores 430C may include numerical or categorical values assigned to content to indicate whether the text adheres to certain standards, guidelines, or rules. These scores can be used to manage of filter content, ensuring that it aligns with community guidelines, legal requirements, or cultural norms. The system may use machine learning systems, including LLMs to analyze and score content. These models are trained on datasets of manually moderated content to recognize patterns and features associated with content that violates guidelines. The output of response processing 420 may include parameters such as response fragments 430A, response embeddings 430B, and/or moderation scores 430C may be used during reference generation 440, where references to be cited in the response are generated. For example, the reference generation 440 includes accessing the vector database 460 and processed news store 470. As described herein, the vector database 460 and processed news store 470 may be the vector database 272 and processed news store 290 generated, e.g., when news is received via the data feed. The references 450 generated using reference generation 440 may then be used to format the final output during final response formatting 480. The response may then be output as user-facing response 490.

FIG. 5 depicts an example user interface presented by some implementations of the disclosed technology. For example, the user interface may include a searching field 518, where a user may input one or more queries, e.g., via one or more I/O devices. The user interface may include a chatbot which may prompt the user with prompt 502 "Hello! How may I help you today?" A user may query a question 504 such as "What is the current outlook for interest rates?" by inputting a text string using a keyboard or voice command. The system may process the prompt as described herein and provide a response 506. The response may further include citations to sources, e.g., from a data feed transmission, including a citation 510. The citations may be associated with each of the references on the right-hand side of the user interface. For example, the system may provide a list of references used in developing a response to the user. The citation may be a direct citation to primary sources.

Reference 516 may include a link 512, which may comprise an interactive link that a user may select (e.g., click on) and that may present the referenced portion of the data feed or open to a webpage. The reference 516 may further include a short description 514 or the first few sentences or words of the reference, so that the user may quickly review the contents of the reference without opening the reference itself. Embedding the citation may include, for example, generating computer-executable code for activating a hyperlink responsive to user interaction at a user interface and injecting the computer-executable code into the output response.

Computer System

Figure 6:
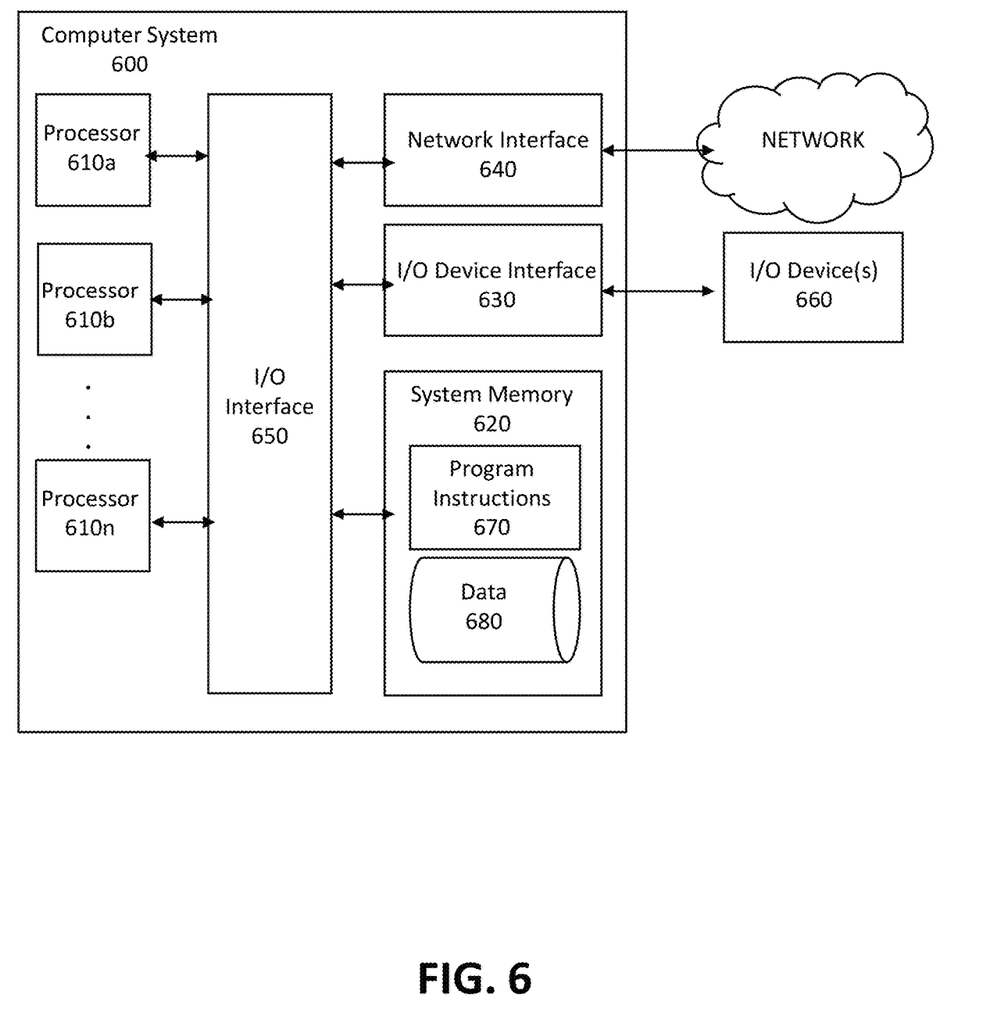
FIG. 6 is a block diagram showing some of the components typically incorporated in at least some of the computer systems and other devices on which the disclosed machine learning platform operates according to some implementations of the disclosed technology.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/ output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computer system 600 to exchange data in a network 614 with an entity that is external to the computing system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 700 to perform operations to execute elements involving the various aspects of the disclosure.

Computing Environment

Figure 7:
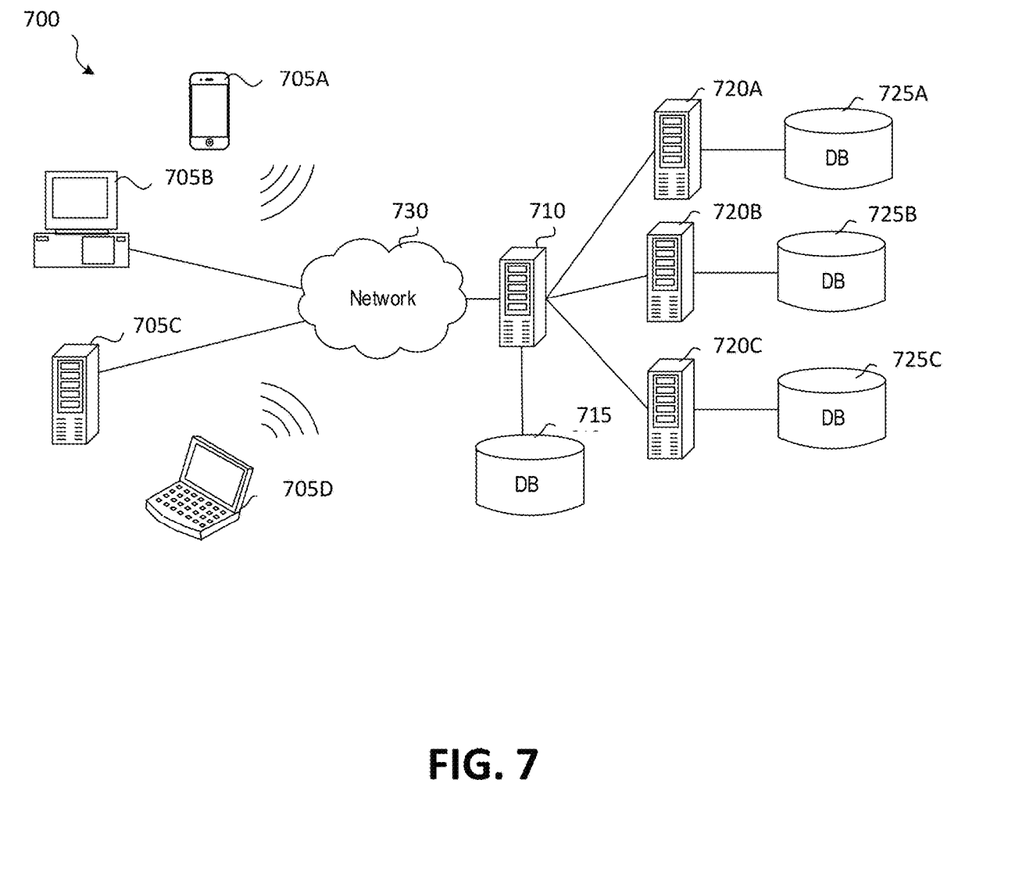
FIG. 7 is a system diagram illustrating an example of a computing environment in which the disclosed machine learning platform operates according to some implementations of the disclosed technology.

FIG. 7 is a system diagram illustrating an example of a computing environment in which the disclosed system operates in some implementations. In some implementations, environment 700 includes one or more client computing devices 705A-D, examples of which can host the machine learning platform 100. Client computing devices 705 operate in a networked environment using logical connections through network 770 to one or more remote computers, such as a server computing device.

In some implementations, server 710 is an edge server which receives client requests and coordinates fulfillment of those requests through other servers, such as servers 620A-C. In some implementations, server computing devices 710 and 720 comprise computing systems, such as the machine learning platform 100. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database. Databases 715 and 725A-C warehouse (e.g., store) information pertinent to applications described herein, including input data, intermediate processing results, output data, and/or post-processing data. Though databases 715 and 725A-C are displayed logically as single units, databases 715 and 725A-C can each be a distributed computing environment encompassing multiple computing devices, can be located within their corresponding server, or can be located at the same or at geographically disparate physical locations.

Network 770 can be a local area network (LAN) or a wide area network (WAN), but can also be other wired or wireless networks. In some implementations, network 770 is the Internet or some other public or private network. Client computing devices 705 are connected to network 770 through a network interface, such as by wired or wireless communication. While the connections between server 710 and servers 720 are shown as separate connections, these connections can be any kind of local, wide area, wired, or wireless network, including network 770 or a separate public or private network.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

Although the present invention has been described in detail with reference to the preferred embodiments, various modifications and enhancements may be made without departing from the scope and spirit of the invention. Those skilled in the art will appreciate that the invention is not limited to the specific examples and embodiments described herein, and that the scope of the invention is defined by the appended claims and their equivalents.

What is claimed is:

1. A computer-implemented method for generating responses to user queries with direct citations to primary sources, the method comprising:
　　accessing a set of documents from a plurality of primary sources via a data feed transmission, wherein data from each source of the plurality of primary sources is transmitted in a different data structure;
　　determining values for a set of parameters based on data of each document of the set of documents, wherein the set of parameters includes a combination of (1) a plurality of segments of each document, (2) one or more entities identified from the data, and (3) scores characterizing the data;
　　organizing values of the set of parameters into a searchable data structure;
　　responsive to receiving a user query at a user interface, inputting a prompt based on the user query into a large-language model;
　　obtaining an output response as a result of inputting the prompt a the large-language model;
　　processing the output response in combination with the searchable data structure to identify references to relevant documents from the set of documents; and
　　embedding, into the output response generated by the large-language model, citations to the references from the plurality of primary sources.

2. The computer-implemented method of claim 1, wherein embedding the citations comprises:
　　generating computer-executable code for activating a hyperlink responsive to user interaction at a user interface; and
　　injecting the computer-executable code into the output response.

3. The computer-implemented method of claim 1, further comprising:
　　comparing each of the one or more entities to an online world-model represented as a knowledge graph; and
　　updating the knowledge graph by adding new nodes corresponding to new entities when an entity of the one or more entities does not already exist in the knowledge graph.

4. The computer-implemented method of claim 1, further comprising:
　　generating embedding vectors based on data of each document of the set of documents; and
　　storing the embedding vectors in a vector database, wherein the embedding vectors are paired with unique identifiers in the vector database.

5. The computer-implemented method of claim 1, further comprising:

determining, for each segment of each document, an importance score representative of an importance of a segment to total information content of a corresponding document, wherein the importance score is determined based on the one or more entities identified, sentiment scores, or segmented text;

identifying, for each document of the set of documents, a set of segments having importance scores that exceed a threshold score; and determining, based on segments having importance scores that exceed the threshold score, one or more topics present in each document.

6. The computer-implemented method of claim 1, wherein processing the output response comprises one or more of:

segmenting the output response, generating embeddings of the output response, or generating a moderation score, wherein the moderation score indicates whether the output response adheres to certain standards, guidelines, or rules.

7. The computer-implemented method of claim 6, further comprising determining to apply one or more different filters to content of the output response based on a value of the moderation score.

8. One or more non-transitory computer-readable media containing instructions which when executed by a processor, cause the processor to perform a method for generating responses to user queries with direct citations to primary sources, the method comprising:

accessing a set of documents from a plurality of primary sources via a data feed transmission, wherein data from each source of the plurality of primary sources is transmitted in a different data structure;

determining values for a set of parameters based on data of each document of the set of documents, wherein the set of parameters includes a combination of (1) a plurality of segments of each document, (2) one or more entities identified from the data, and (3) scores characterizing the data;

organizing values of the set of parameters into a searchable data structure;

responsive to receiving a user query at a user interface, inputting a prompt based on the user query into a large-language model;

obtaining an output response as a result of inputting the prompt into the large-language model;

processing the output response in combination with the searchable data structure to identify references to relevant documents from the set of documents; and embedding, into the output response generated by the large-language model, citations to the references from the plurality of primary sources.

9. The one or more non-transitory computer-readable media of claim 8, wherein embedding the citations comprises:

generating computer-executable code for activating a hyperlink responsive to user interaction at a user interface; and injecting the computer-executable code into the output response.

10. The one or more non-transitory computer-readable media of claim 8, wherein the method further comprises:

comparing each of the one or more entities to an online world-model represented as a knowledge graph; and updating the knowledge graph by adding new nodes corresponding to new entities when an entity of the one or more entities does not already exist in the knowledge graph.

11. The one or more non-transitory computer-readable media of claim 8, wherein the method further comprises:

generating embedding vectors based on data of each document of the set of documents; and storing the embedding vectors in a vector database, wherein the embedding vectors are paired with unique identifiers in the vector database.

12. The one or more non-transitory computer-readable media of claim 8, wherein the method further comprises:

determining, for each segment of each document, an importance score representative of an importance of a segment to total information content of a corresponding document, wherein the importance score is determined based on the one or more entities identified, sentiment scores, or segmented text;

identifying, for each document of the set of documents, a set of segments having importance scores that exceed a threshold score; and determining, based on segments having importance scores that exceed the threshold score, one or more topics present in each document.

13. The one or more non-transitory computer-readable media of claim 8, wherein processing the output response comprises one or more of:

segmenting the output response, generating embeddings of the output response, or generating a moderation score, wherein the moderation score indicates whether the output response adheres to certain standards, guidelines, or rules.

14. The one or more non-transitory computer-readable media of claim 13, further comprising determining to apply one or more different filters to content of the output response based on a value of the moderation score.

15. A system for generating responses to user queries with direct citations to primary sources, the system comprising:

one or more processors; and one or more non-transitory computer-readable media storing instructions that, when executed by the one or more processors, cause the one or more processors to perform operations comprising:

accessing a set of documents from a plurality of primary sources via a data feed transmission, wherein data from each source of the plurality of primary sources is transmitted in a different data structure;

determining values for a set of parameters based on data of each document of the set of documents, wherein the set of parameters includes a combination of (1) a plurality of segments of each document, (2) one or more entities identified from the data, and (3) scores characterizing the data;

organizing values of the set of parameters into a searchable data structure;

responsive to receiving a user query at a user interface, inputting a prompt based on the user query into a large-language model;

obtaining an output response as a result of inputting the prompt into the large-language model;

processing the output response in combination with the searchable data structure to identify references to relevant documents from the set of documents; and embedding, into the output response generated by the large-language model, citations to the references from the plurality of primary sources.

16. The system of claim 15, wherein embedding the citations comprises:
- generating computer-executable code for activating a hyperlink responsive to user interaction at a user interface; and
- injecting the computer-executable code into the output response.

17. The system of claim 15, wherein the one or more non-transitory computer-readable media further cause operations comprising:
- comparing each of the one or more entities to an online world-model represented as a knowledge graph; and
- updating the knowledge graph by adding new nodes corresponding to new entities when an entity of the one or more entities does not already exist in the knowledge graph.

18. The system of claim 15, wherein the one or more non-transitory computer-readable media further cause operations comprising:
- generating embedding vectors based on data of each document of the set of documents; and
- storing the embedding vectors in a vector database, wherein the embedding vectors are paired with unique identifiers in the vector database.

19. The system of claim 15, wherein the one or more non-transitory computer-readable media further cause operations comprising:
- determining, for each segment of each document, an importance score representative of an importance of a segment to total information content of a corresponding document, wherein the importance score is determined based on the one or more entities identified, sentiment scores, or segmented text;
- identifying, for each document of the set of documents, a set of segments having importance scores that exceed a threshold score; and
- determining, based on segments having importance scores that exceed the threshold score, one or more topics present in each document.

20. The system of claim 15, wherein processing the output response comprises one or more of:
- segmenting the output response,
- generating embeddings of the output response, or
- generating a moderation score, wherein the moderation score indicates whether the output response adheres to certain standards, guidelines, or rules.

* * * * *